United States Patent
McKinnon, Jr.

(10) Patent No.: US 7,610,840 B2
(45) Date of Patent: Nov. 3, 2009

(54) NON-FRANGIBLE COUPLING ELEMENT WITH EXPLOSIVE LOAD RELEASE

(75) Inventor: Charles N. McKinnon, Jr., Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 11/935,588

(22) Filed: Nov. 6, 2007

(65) Prior Publication Data

US 2009/0116900 A1    May 7, 2009

(51) Int. Cl.
*B64D 1/02*    (2006.01)
*F42B 15/10*   (2006.01)

(52) U.S. Cl. .................................. 89/1.14; 102/378

(58) Field of Classification Search .............. 89/1.14; 137/68.13; 102/377–378; 403/2, 109.1, 403/109.2, 109.7
See application file for complete search history.

(56) References Cited

U.S. PATENT DOCUMENTS 3,134,222 A * 5/1964 Maxson ................. 102/378
3,737,975 A   6/1973 McKinnon, Jr.

* cited by examiner

*Primary Examiner*—Victor MacArthur

(57) ABSTRACT

A non-frangible releasable coupling device as described herein includes an explosive element that, when detonated, bends a load carrying element in a manner that releases the coupled components from each other. Before detonation, the load carrying element is under axial compressive stress imparted by the components. Upon detonation, the explosive element causes the load carrying element to bend into a retraction cavity formed in one of the components, thus allowing the components to displace relative to each other.

17 Claims, 7 Drawing Sheets

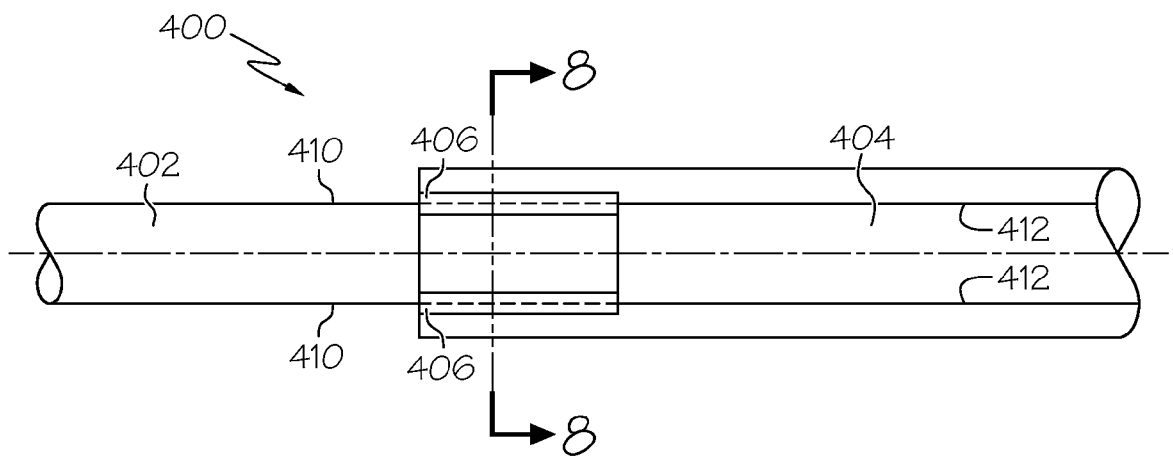
FIG. 7
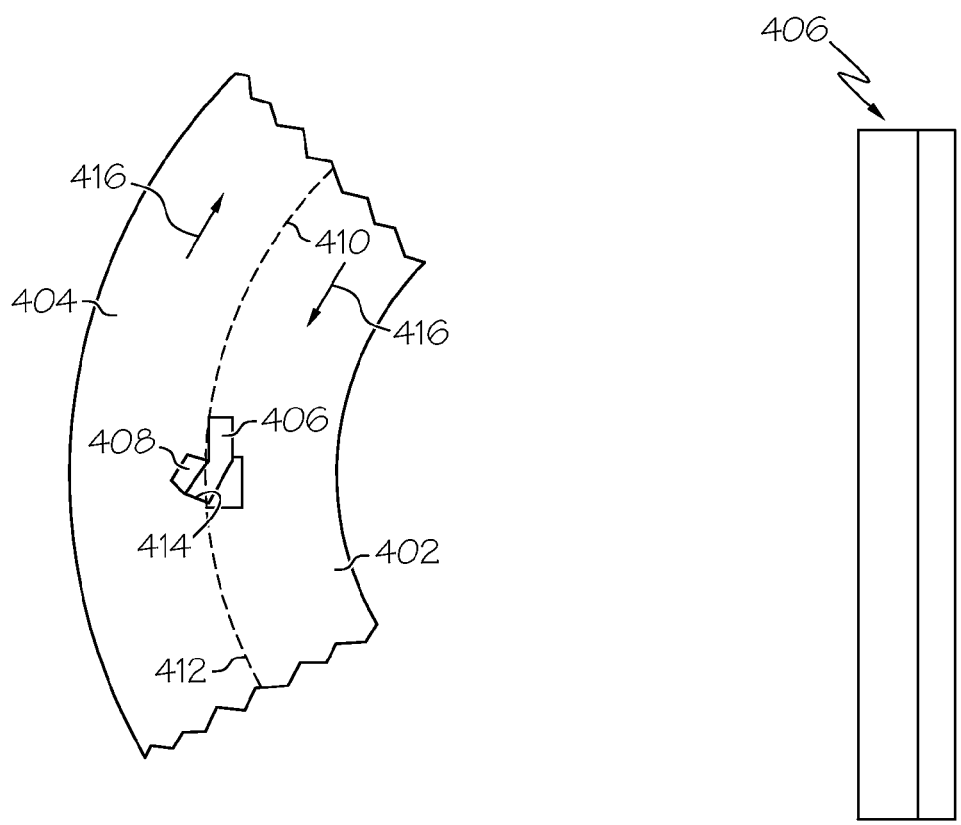
FIG. 8
FIG. 9

NON-FRANGIBLE COUPLING ELEMENT WITH EXPLOSIVE LOAD RELEASE

TECHNICAL FIELD

Embodiments of the subject matter described herein relate generally to releasable fasteners and coupling devices. More particularly, embodiments of the subject matter relate to an explosive non-frangible coupling element that releases upon detonation.

BACKGROUND

Releasable fasteners, coupling devices, and securing mechanisms are often used to temporarily couple components together. Explosive couplers are commonplace within the aerospace industry. Explosive couplers are used to securely attach components together until a release time when an explosive is detonated to separate the components from one another. For example, explosive load release devices are typically used in spacecraft and launch vehicles (during ejection of the first propulsion stage of a multi-stage rocket). Since the late 1940s, the increasing use of space around earth has resulted in a troublesome debris field, where some of this debris is due to explosive load release devices.

Regulatory agencies have been diligent in their attempts to minimize the amount of debris left in space. Consequently, efforts have been made to capture or reduce the frangible pieces of separation devices that are created post-detonation. For instance, the Space Shuttle uses eight large nuts to hold the two solid rocket boosters to the launch pad (each nut has 2.5 inch diameter threads, and weighs about 12.5 pounds). Upon the launch release command, the nuts split and are captured in a padded fairing, and remain with the booster until that stage is recovered at sea. Unfortunately, debris capture systems and related mechanisms involve additional weight, maintenance, and cost.

BRIEF SUMMARY

Various embodiments of a non-frangible releasable coupling device are described herein. These embodiments employ an explosive element that deflects, deforms, or bends a load carrying element upon detonation, thus releasing the components from one another. The detonation of the explosive element does not result in breakage of the load carrying element.

The above and other aspects may be found in an embodiment of a non-frangible releasable coupling device having: a first component comprising a first load bearing feature, and a retraction cavity formed therein; a second component comprising a second load bearing feature; a load carrying element comprising a first end configured for engagement with the first load bearing feature, and a second end configured for engagement with the second load bearing feature, the load carrying element being configured to impede displacement of the first component relative to the second component in at least one direction; and a charged element located adjacent to the load carrying element. Upon detonation, the charged element forces the second end of the load carrying element into the retraction cavity such that displacement of the first component relative to the second component in the at least one direction is no longer impeded.

The above and other aspects may be found in an embodiment of a non-frangible releasable coupling device having: a first component comprising a load carrying element protruding therefrom, and a retraction cavity formed therein; a second component comprising a load bearing feature, the load bearing feature being configured to receive the load carrying element, and the load carrying element being configured to impede displacement of the first component relative to the second component in at least one direction; an explosive cavity formed in the second component proximate the load bearing feature; and an explosive element in the explosive cavity and located between the second component and the load carrying element. Upon detonation, the explosive element forces the load carrying element into the retraction cavity such that displacement of the first component relative to the second component in the at least one direction is no longer impeded.

The above and other aspects may be carried out by an embodiment of a method of temporarily coupling components together. The method involves providing a first component having a load carrying element protruding therefrom, and having a retraction cavity formed therein, and providing a second component having a load bearing feature, an explosive cavity formed therein, and an explosive element in the explosive cavity, the load bearing feature being configured to receive the load carrying element. The method then fastens the first component and the second component together such that the load carrying element is axially loaded by the load bearing feature, thereby impeding displacement of the first component relative to the second component in at least one direction. Thereafter, the method detonates the explosive element to force the load carrying element into the retraction cavity, and to release the second component from the first component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 is a partial cross sectional view of an embodiment of a rotational non-frangible releasable coupling device;

FIG. 8 is a cross sectional view of a section of the coupling device shown in FIG. 7, as viewed from line 8-8;

FIG. 9 is a plan view of an embodiment of a load carrying element suitable for use with the coupling device shown in FIG. 7.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

A non-frangible releasable coupling device as described herein allows the separation of two components carrying a load without breaking any nuts, bolts, or retaining elements, and without requiring capture or storage of any loose parts. The embodiments described herein utilize a primary explosive (detonator) and a secondary high explosive that releases the components. A secondary explosive is desirable in applications where it is important to maintain a low jitter time among multiple break points.

An embodiment of a non-frangible releasable coupling could be configured for use with space missions, for example, during launch, rocket stage jettison, or the like. In addition, there are probably numerous cases where such a non-frangible releasable coupling device could be used for earth-based loads. For example, a non-frangible releasable coupling device might be deployed on tugboats towing large, heavy barges of ore, in lakes (or oceans) subject to intense, sudden storms. If a tugboat crew determines that conditions are unsafe, then it might be desirable to quickly release the barge. Other applications are suitable for use in the mining, heavy construction, and ocean oil platform industries.

Threaded shafts (bolts) with nuts are a common means of temporarily creating tension or compression loads in many different applications. For instance, each of the two solid booster rockets of the Space Shuttle use four shafts/nuts to keep the entire Space Shuttle anchored to the pad prior to launch. In addition to tension release, compression, torsion, and any combination thereof can be accommodated by an embodiment of a non-frangible releasable coupling device. The technique described herein is also benign enough to be safe in the presence of nearby observers.

Figure 1A:
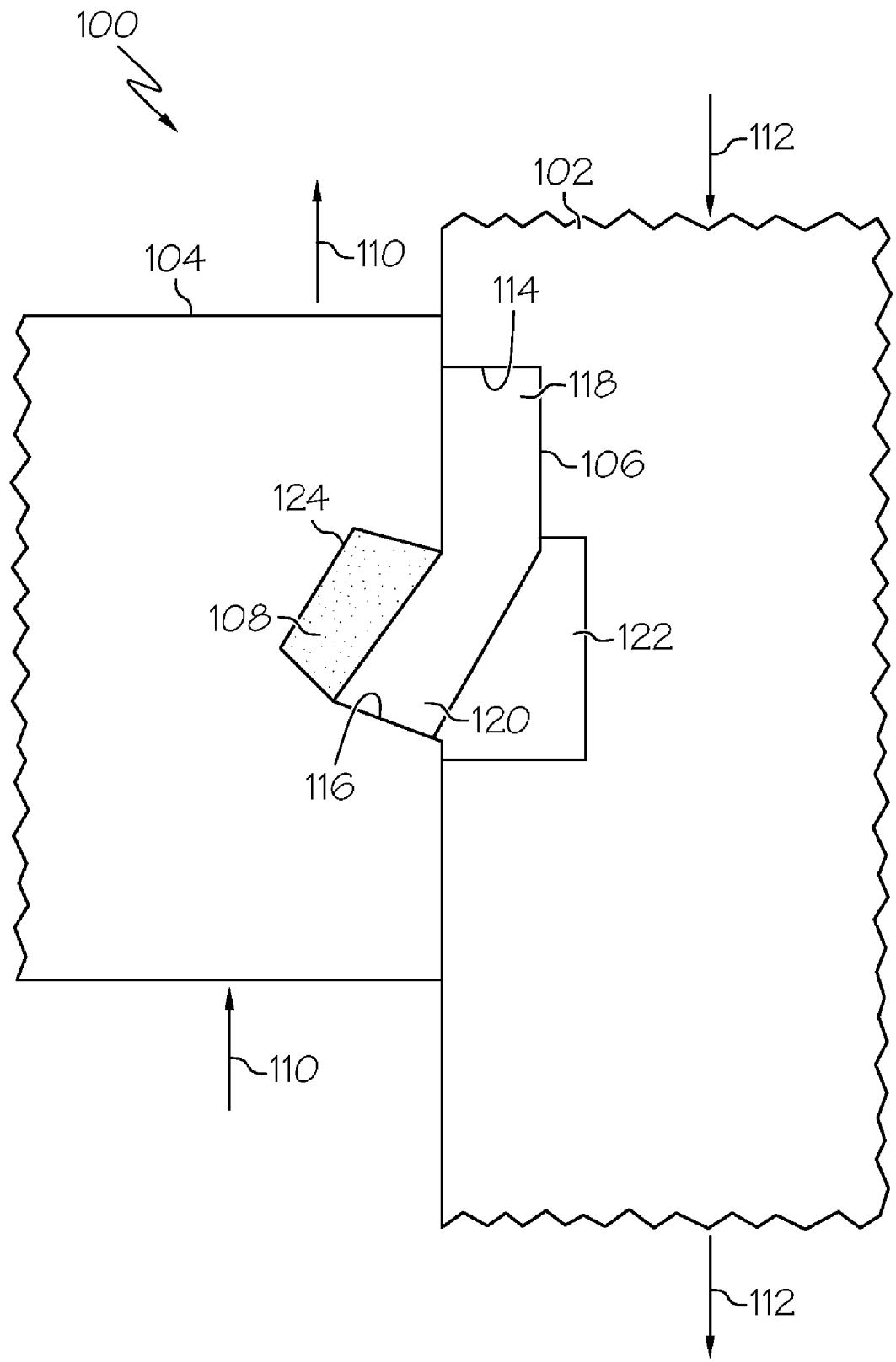
FIG. 1A is a diagram that illustrates the pre-detonation state of an embodiment of a non-frangible releasable coupling device.
Figure 2:
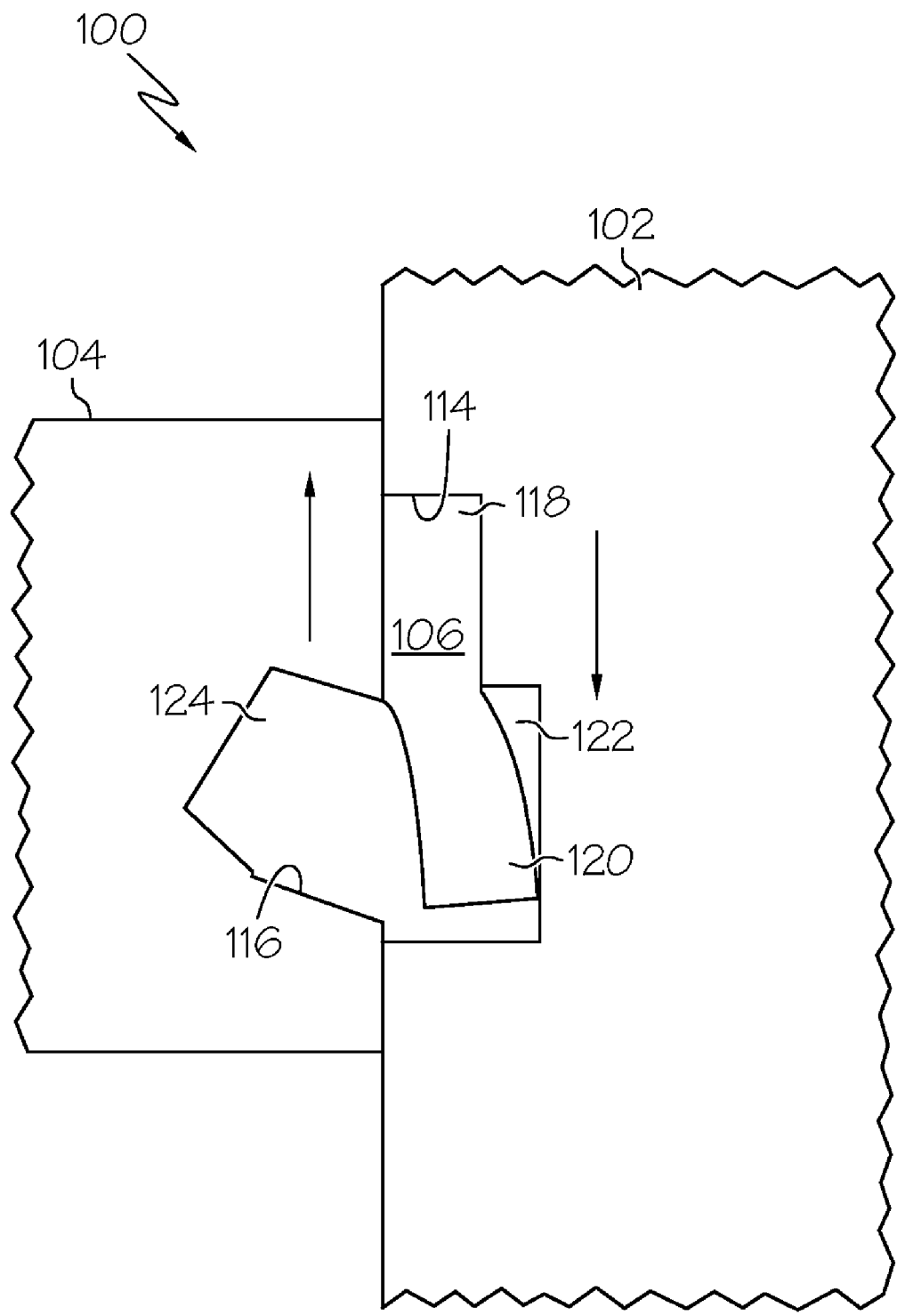
FIG. 2 is a diagram that illustrates the post-detonation state of the coupling device shown in FIG. 1A.

FIG. 1A is a diagram that illustrates an embodiment of a non-frangible releasable coupling device 100 in its pre-detonation state, and FIG. 2 is a diagram that illustrates coupling device 100 in its post-detonation state. Coupling device 100 has been simplified in FIG. 1A and FIG. 2 for clarity and ease of description. This embodiment of coupling device includes, without limitation: a first component 102; a second component 104; a load carrying element 106; and an explosive element 108. In the pre-detonation state shown in FIG. 1A, first component 102 and second component 104 are loaded relative to each other such that load carrying element 106 experiences axial loading (compressive loading). This loading condition may be created by forcing second component 104 in the direction generally indicated by the arrows 110 and/or by forcing first component 102 in the direction generally indicated by the arrows 112. Depending upon the actual deployment and configuration of coupling device 100, this loading condition may be established via: a threaded engagement between first component 102 and second component 104; torsion between first component 102 and second component 104; external forces or loads carried by first component 102 and/or second component; or the like.

First component 102 includes a load bearing feature 114, and second component 104 includes a load bearing feature 116. For this embodiment, load bearing feature 114 is realized as a shoulder formed in first component 102. Alternatively, load bearing feature 114 could be a slot, a depression, a keyway, a hole, or a protruding feature on first component 102. Load bearing feature 114 is preferably shaped, sized, and configured to accommodate a first end 118 of load carrying element 106. In this regard, first end 118 is suitably shaped, sized, and configured for engagement with load bearing feature 114. Here, the end surface of first end 118 engages and mates with a corresponding surface of load bearing feature 114. In certain embodiments, first end 118 of load carrying element 106 is attached to first component 102 in the position depicted in FIG. 1A, such that first end 118 resides in (or adjacent to) load bearing feature 114. In practice, load carrying element 106 can be affixed to first component 102 using one or more fasteners, a bonding or adhesive material, by spot welding, or the like. In alternate embodiments, load carrying element 106 is an integrated feature of first component 102.

Load bearing feature 116 of second component 104 may be similarly configured. For this embodiment, load bearing feature 116 is realized as a shoulder formed in second component 104. Alternatively, load bearing feature 116 could be a slot, a depression, a keyway, a hole, or a protruding feature on second component 104. Load bearing feature 116 is preferably shaped, sized, and configured to accommodate a second end 120 of load carrying element 106. In this regard, second end 120 is suitably shaped, sized, and configured for engagement with load bearing feature 116. Here, the end surface of second end 120 engages and mates with a corresponding surface of load bearing feature 116. In certain embodiments, rather than having first end 118 of load carrying element 106 attached to first component 102, second end 120 of load carrying element 106 is attached to second component 104 in the position depicted in FIG. 1A, such that second end 120 resides in (or adjacent to) load bearing feature 116. For such an embodiment, load carrying element 106 can be affixed to second component 104 using one or more fasteners, a bonding or adhesive material, by spot welding, or the like. For this particular example, first end 118 of load carrying element 106 is attached to first component 102, and second end 120 of load carrying element 106 is not attached to second component 104.

When in the pre-detonation state, load carrying element 106 protrudes from first component 102, and extends into second component 104. When under an axial load as depicted in FIG. 1A, load carrying element 106 represents an axial load bearing element that is compressed between load bearing features 114/116. In practice, load carrying element 106 is shaped, sized, and configured to withstand the anticipated compressive loading forces without bending, deforming, breaking, or buckling. Thus, load carrying element 106 "locks" components 102/104 together and prevents movement of components 102/104 relative to each other. In other words, load carrying element 106 is suitably configured to impede displacement of first component 102 relative to second component 104 in at least one direction.

In certain embodiments, load carrying element 106 is formed from a strong yet bendable material, such as steel, aluminum, copper, brass, 300 series stainless steel, or the like. In such embodiments, load carrying element 106 can be fabricated from a sheet or bar of metal having the desired thickness and structural properties. In addition, the material can be shaped, bent, or otherwise formed with the desired angle or contour as shown in FIG. 1A. Load carrying element 106 may also be constructed to have a hardened, high yield, smooth surface (which abuts load bearing feature 116), while still retaining a malleable, bendable, low yield, middle span between its ends 118/120. Load carrying element 106 may be bent at a slight angle or up to a ninety degree angle, depending upon the particular embodiment. Load carrying element 106 may have a rectangular cross section, a circular cross section, or any suitable cross sectional shape. Moreover, load carrying element 106 may be shaped for enhanced buckling tolerance (e.g., it may be tooth shaped). In alternate embodiments, load carrying element 106 is considered to be an element of first component 102, and it may be an integral part of first component 102. Notably, load carrying element 106 is pliable, flexible, deformable, or bendable under a threshold amount of explosive force imparted by explosive element 108. FIG. 2 depicts load carrying element 106 in a bent and deflected position after detonation of explosive element 108.

The illustrated embodiment of coupling device 100 includes a retraction cavity 122 formed in first component 102. For this embodiment, retraction cavity 122 is realized as a pocket that extends into the wall of first component 102. In practice, retraction cavity 122 may be continuous with load bearing feature 114 because both of these features can be realized as grooves or slots formed in first component 102. In other words, load bearing feature 114 and retraction cavity 122 can be formed together as an integrated cavity in first component 102. Retraction cavity 122 is preferably shaped, sized, and configured to receive and accommodate second end 120 of load carrying element 106 after detonation of explosive element 108. In this regard, retraction cavity opposes load bearing feature 116 and opposes second end 120 while coupling device is in the pre-detonation state shown in FIG. 1A. Having retraction cavity 122 in opposed alignment with second end 120 enables second end 120 to easily enter retraction cavity 122 upon detonation. In addition, retraction cavity 122 is large enough to fully receive second end 120, preferably such that no portion of second end protrudes beyond the outer wall of first component 102 after detonation. This characteristic ensures that second end 120 does not interfere with the release of second component 104 from first component 102.

The illustrated embodiment of coupling device 100 also includes an explosive (or charge) cavity 124 formed in second component 104. Explosive cavity 124 is located proximate to load bearing feature 116 and on one side of second end 120 of load carrying element 106. Explosive cavity 124 is suitably shaped, sized, and configured to accommodate and retain explosive element 108 in place before detonation. For this particular embodiment, explosive cavity 124 retains explosive element 108 between second component 104 and second end 120 of load carrying element 106, as depicted in FIG. 1A. Explosive cavity 124 may be realized as a pocket that extends into the wall of second component 104. In practice, explosive cavity 124 may be continuous with load bearing feature 116 because both of these features can be realized as grooves or slots formed in second component 104. In other words, load bearing feature 116 and explosive cavity 124 can be formed together as an integrated cavity in second component 104.

As shown in FIG. 1A, retraction cavity 122 is arranged such that it opposes explosive cavity 124 when coupling device is in the pre-detonation state. Having retraction cavity 122 in opposed alignment with explosive cavity 124 enhances the ease with which second end 120 of load carrying element 106 enters retraction cavity 122. This alignment is desirable to facilitate efficient deflection of load carrying element 106 upon detonation.

Explosive element 108 is one implementation of a charged element for coupling device. Explosive element 108 is located adjacent to load carrying element 106 when coupling device 100 is in the pre-detonation state shown in FIG. 1A. Upon detonation, explosive element 108 forces second end 120 of load carrying element 106 into retraction cavity 122 (depicted in FIG. 2). After second end 120 has been deflected into retraction cavity 122, first component 102 and second component 104 are free to move in the previously locked direction. In other words, after detonation of explosive element 108, displacement of first component 102 relative to second component 104 (in the respective direction(s)) is no longer impeded. Notably, load carrying element 106 is suitably configured and designed to bend without breaking, separating, or decomposing in response to detonation of explosive element 108. This ensures that loose debris is not emitted as a result of detonation.

In certain embodiments, explosive element 108 is a secondary explosive that is detonated by a primary explosive such as a blasting cap. Explosive element 108 is composed of a detonating material that does not ignite or decompose under high temperatures. In one practical embodiment, explosive element 108 is a composite material having high tensile, shear, and compression strength, which adds to the stability of coupling device 100 under high uni-axial loads. For example, explosive element 108 can be formed or cast from a compound that when cured can be machined into the desired shape. As another example, explosive element 108 may include a plastic explosive that is injected into explosive cavity 124 during assembly or after initial assembly of coupling device 100. In yet another embodiment, explosive element 108 is formed from a liquid that catalyzes into a solid, where the liquid can be injected into explosive cavity 124 during assembly or after initial assembly of coupling device 100. For the sake of brevity, conventional and well known aspects of explosives, detonators, detonation control, and other functional aspects of the coupling device 100 are not described in detail herein.

Figure 1B:
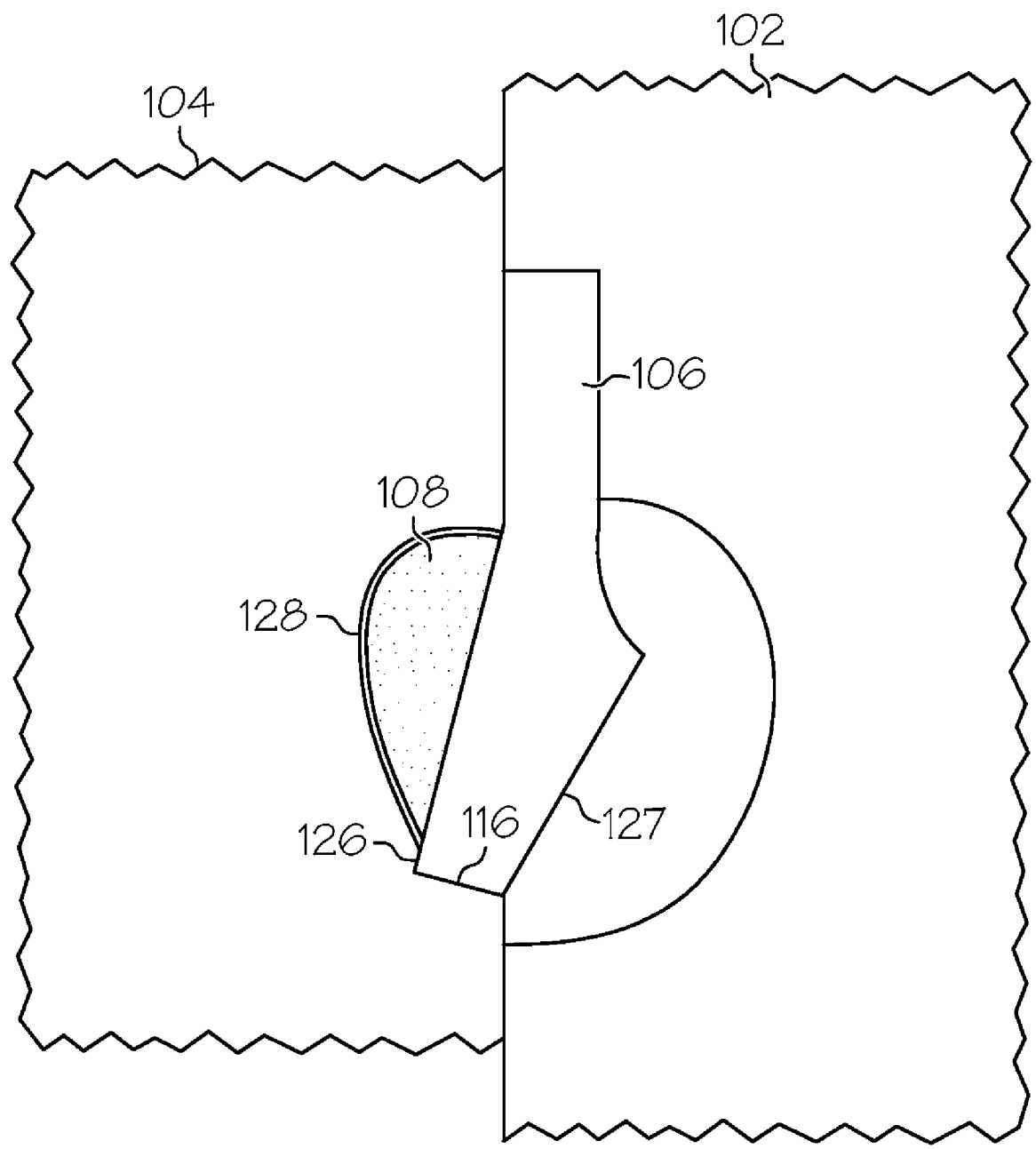
FIG. 1B is a diagram that illustrates an alternate configuration of the coupling device shown in FIG. 1A.

FIG. 1B is a diagram that illustrates an alternate configuration for coupling device 100. Here, load bearing feature 116 includes a lip 126 that maintains load carrying element 106 in place. Lip 126 is also designed to reduce the likelihood of buckling of load carrying element 106. This embodiment of load carrying element 106 includes an anti-buckling feature 127, such as a periodic spine along its entire length or a tapered protrusion. In this context, a periodic spine can be realized as parallel reinforcing ribs that are arranged to be in approximate alignment with the direction of the compressive forces applied to load carrying element 106. Anti-buckling feature 127 is suitably designed and configured to enhance the structural properties of load carrying element 106, and to increase its resistance to buckling. FIG. 1B also depicts a thermal isolating layer 128, which may be applied between the boundary of second component 104 and explosive element 108. Thermal isolating layer 128 can be used to maintain detonation at small explosive cross sections. In one embodiment, thermal isolating layer 128 is formed from a sprayed ceramic material.

FIG. 1B also depicts a curved contour for the explosive cavity and for the retraction cavity. In practice, these curved profiles may be desirable to reduce stress concentration points that might otherwise be present in an embodiment that utilizes ninety degree transitions in these areas.

FIG. 1A and FIG. 2 depict a generalized structure that illustrates the operation of coupling device 100. In practice, an embodiment of coupling device 100 can be suitably configured to facilitate the releasable coupling of different types of components under different loading conditions. FIGS. 3-10 illustrate different exemplary embodiments that might implement the general concept and techniques described above; these embodiments are merely representative and are not intended to limit or otherwise restrict the application or scope of the subject matter presented herein. Moreover, some of the features, functions, and characteristics of the embodiments depicted in FIGS. 3-10 are similar or identical to those described above with reference to coupling device 100. Such common features, functions, and characteristics will not be redundantly described in detail herein.

Figure 3:
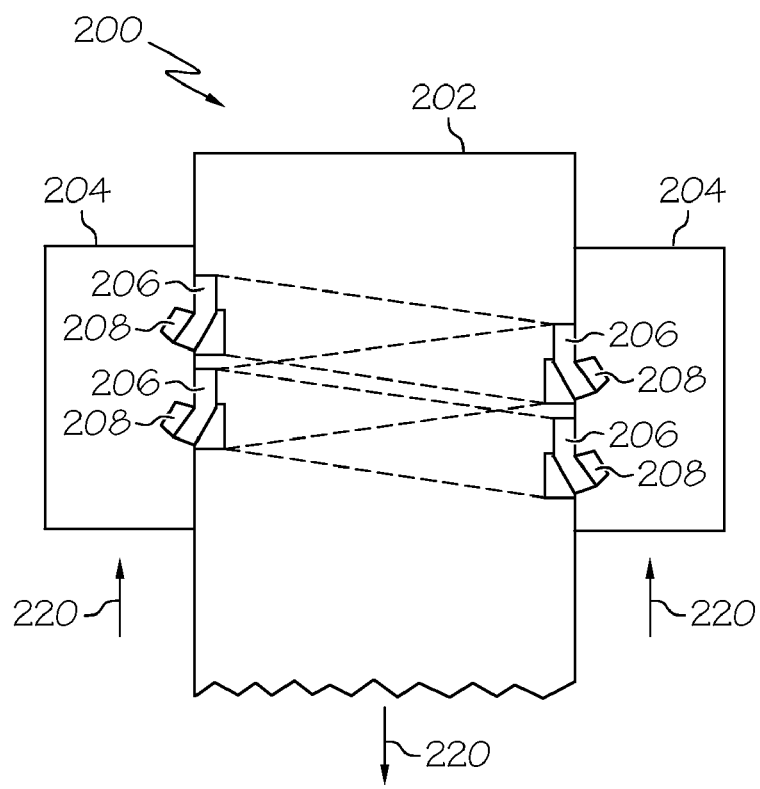
FIG. 3 is a cross sectional view of an embodiment of a threaded non-frangible releasable coupling device.
Figure 4:
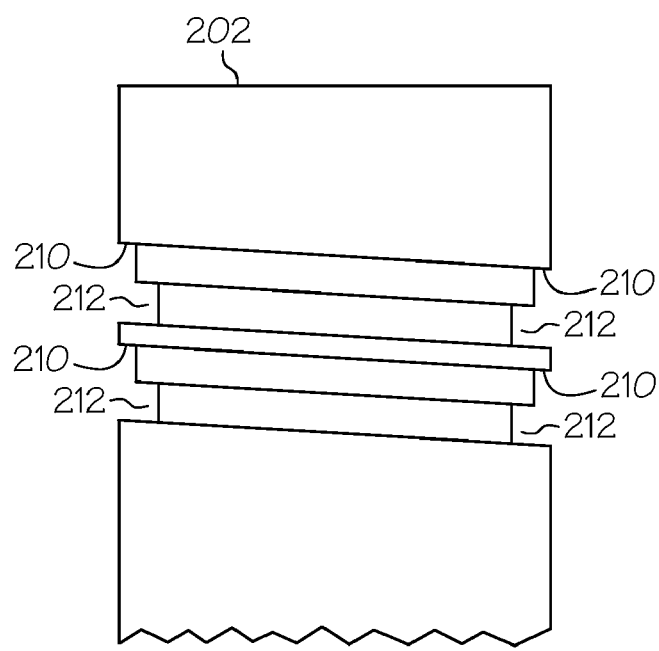
FIG. 4 is a side view of the inner component of the coupling device shown in FIG. 3.
Figure 5:
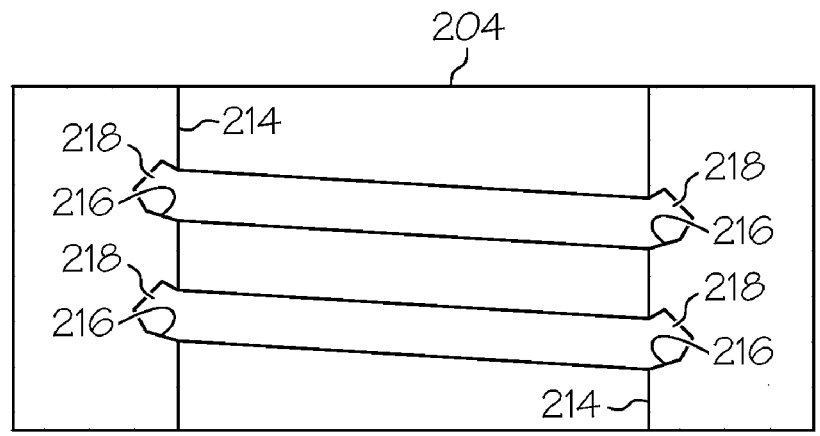
FIG. 5 is a cross sectional view of the outer component of the coupling device shown in FIG. 3.

FIG. 3 is a cross sectional view of an embodiment of a threaded non-frangible releasable coupling device 200, FIG. 4 is a side view of an inner component 202 of coupling device 200, and FIG. 5 is a cross sectional view of an outer component 204 of coupling device 200. Coupling device 200 also includes a load carrying element 206 and an explosive element 208. Outer component 204 at least partially surrounds inner component 202 when coupling device 200 is coupled together (in the pre-detonation state). In this embodiment, inner component 202 is akin to first component 102, and outer component 204 is akin to second component 104 (described above with reference to FIG. 1A).

Inner component 202 includes a helical shoulder 210 that serves as its load bearing feature. For the illustrated embodiment, helical shoulder 210 (see FIG. 4) is formed around inner component 202 in a continuous spiraling manner. Similarly, inner component 202 includes a helical retraction cavity 212 that is formed around inner component 202 in a continuous spiraling manner.

Outer component 204 includes an interior wall 214 that faces inner component 202 when coupling device 200 is assembled (as depicted in FIG. 3). Outer component 204 has a helical shoulder 216 that serves as its load bearing feature for load carrying element 206. For this embodiment, helical shoulder 216 is formed around interior wall 214 in a continuous spiraling manner. Likewise, outer component 204 includes a helical explosive cavity 218 that is formed around interior wall 214 in a continuous spiraling manner.

Referring to FIG. 3, coupling device 200 is suitably configured to resemble a threaded fastener arrangement. Although a two-turn thread arrangement is depicted for illustrative purposes, the actual number of turns in an embodiment can be selected to suit the desired load and other design parameters. In this regard, inner component 202 may be considered to be a bolt, while outer component may be considered to be a nut that can be threaded onto the bolt to establish the axial loading condition represented by the arrows 220 in FIG. 3. Here, load carrying element 206 is realized as a helical thread element coupled around the bolt. As mentioned above, load carrying element 206 may be attached to inner component 202 or it may be integrally formed with inner component 202.

Explosive element 208 may be an explosive bead, an explosive thread, a self-contained explosive component, a cast or cured explosive composite, or the like. Coupling device 200 can be assembled by threading the nut and the bolt together to achieve a desired torque, before or after explosive element 208 is in place. In certain embodiments, explosive element 208 can be formed after assembling the nut and bolt together by injection or insertion of uncured explosive material into one or more passageways (not shown) that lead into explosive cavity 218. After curing, the arrangement shown in FIG. 3 is achieved. The other explosive cavities described here may also be filled in this manner.

Detonation of explosive element 208 may be initiated at one end thereof. The nature of the explosive material ensures that all of explosive element 208 will be quickly detonated with minimal delay. Detonation forces load carrying element 206 into the retraction cavity, disengaging inner component 202 from outer component 204. This allows inner component 202 to slide downward relative to outer component 204. This disengagement only ejects the explosive gaseous byproducts, while other solid parts remain intact.

Figure 6:
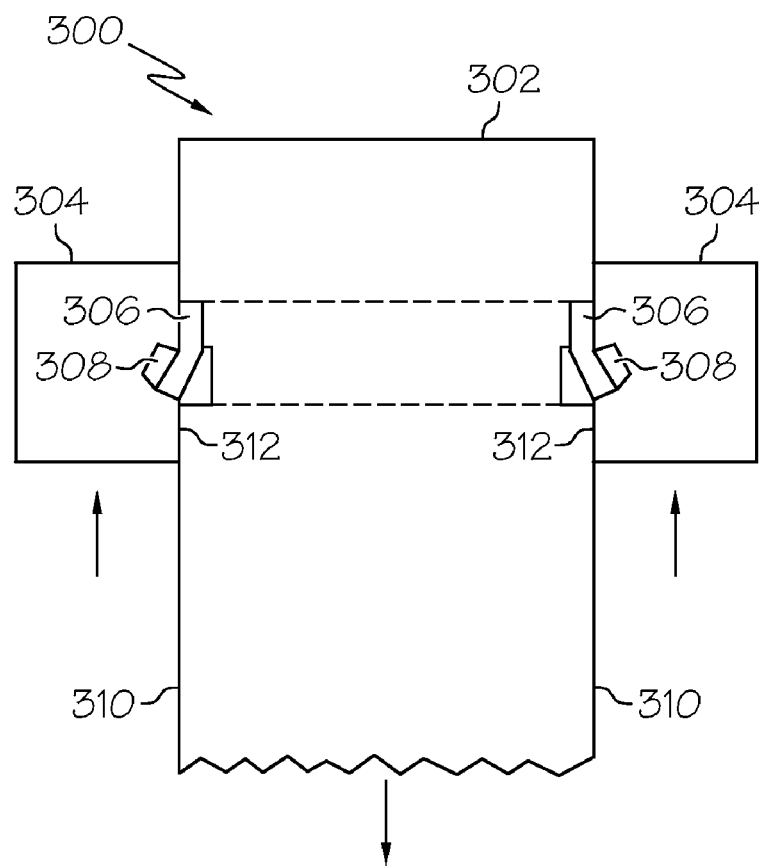
FIG. 6 is a cross sectional view of an embodiment of a sleeved non-frangible releasable coupling device.

FIG. 6 is a cross sectional view of an embodiment of a sleeved non-frangible releasable coupling device 300. Coupling device 300 generally includes, without limitation: a generally cylindrical inner component or shaft 302; an outer component or sleeve 304; a load carrying ring element 306; and a ring-shaped explosive element 308. Shaft 302 has an outer wall 310, and sleeve 304 has a generally cylindrical interior wall 312 that faces outer wall 310. Although a cylindrical configuration is described here, coupling device 300 could be suitably configured to support other cross sectional shapes, including, without limitation: square, rectangular, triangular, oval, or the like.

Explosive element 308 may be an explosive bead, an explosive thread, a self-contained explosive component, a cast or cured explosive composite, or the like. In practice, sleeve 304 may be realized as a multiple-part component that facilitates coupling of sleeve 304 around shaft 302. For example, sleeve 304 may be realized as a split component (e.g., two C-shaped halves) that is secured around shaft 302 using bolts or other fasteners. Alternatively, sleeve 304 may be realized as an assembly having an outer nut and a concentric inner nut that lock together via a threaded engagement. Coupling device 300 can be assembled by securing sleeve 304 around shaft 302, before or after explosive element 308 is in place. In certain embodiments, explosive element 308 can be formed after securing sleeve 304 around shaft 302, as described above for coupling device 200.

FIG. 7 is a partial cross sectional view of an embodiment of a rotational non-frangible releasable coupling device 400, and FIG. 8 is a cross sectional view of a section of coupling device 400, as viewed from line 8-8. This embodiment of coupling device 400 includes, without limitation: an inner component 402; an outer component 404; at least one load carrying element 406; and at least one explosive element 408. Inner component 402 has a generally cylindrical outer wall 410, and outer component 404 has a generally cylindrical inner wall 412 that is adjacent to outer wall 410 (when coupling device 400 is in the pre-detonation state shown in FIG. 7). For this embodiment, load carrying element 406 is realized as a straight bar having the desired cross sectional shape, such as that depicted in FIG. 8. In this regard, FIG. 9 is a plan view of an embodiment of load carrying element 406 suitable for use with coupling device 400. In practice, any number of load carrying elements 406 may be employed. Moreover, load carrying elements 406 may be oriented in different directions to impede relative rotation of the components in both directions.

During assembly, inner component 402 slides within outer component 404, and load carrying element 406 cooperates with a load bearing feature 414 of outer component 404. During assembly, load carrying element 406 and load bearing feature 414 serve as a key/keyway arrangement for coupling device 400. After assembly, load carrying element 406 impedes rotation of inner component 402 (about its longitudinal axis) relative to outer component 404, and vice versa, in at least one direction of rotation. The arrows 416 in FIG. 8 illustrate the relative rotation that is impeded by load carrying element 406.

Figure 10:
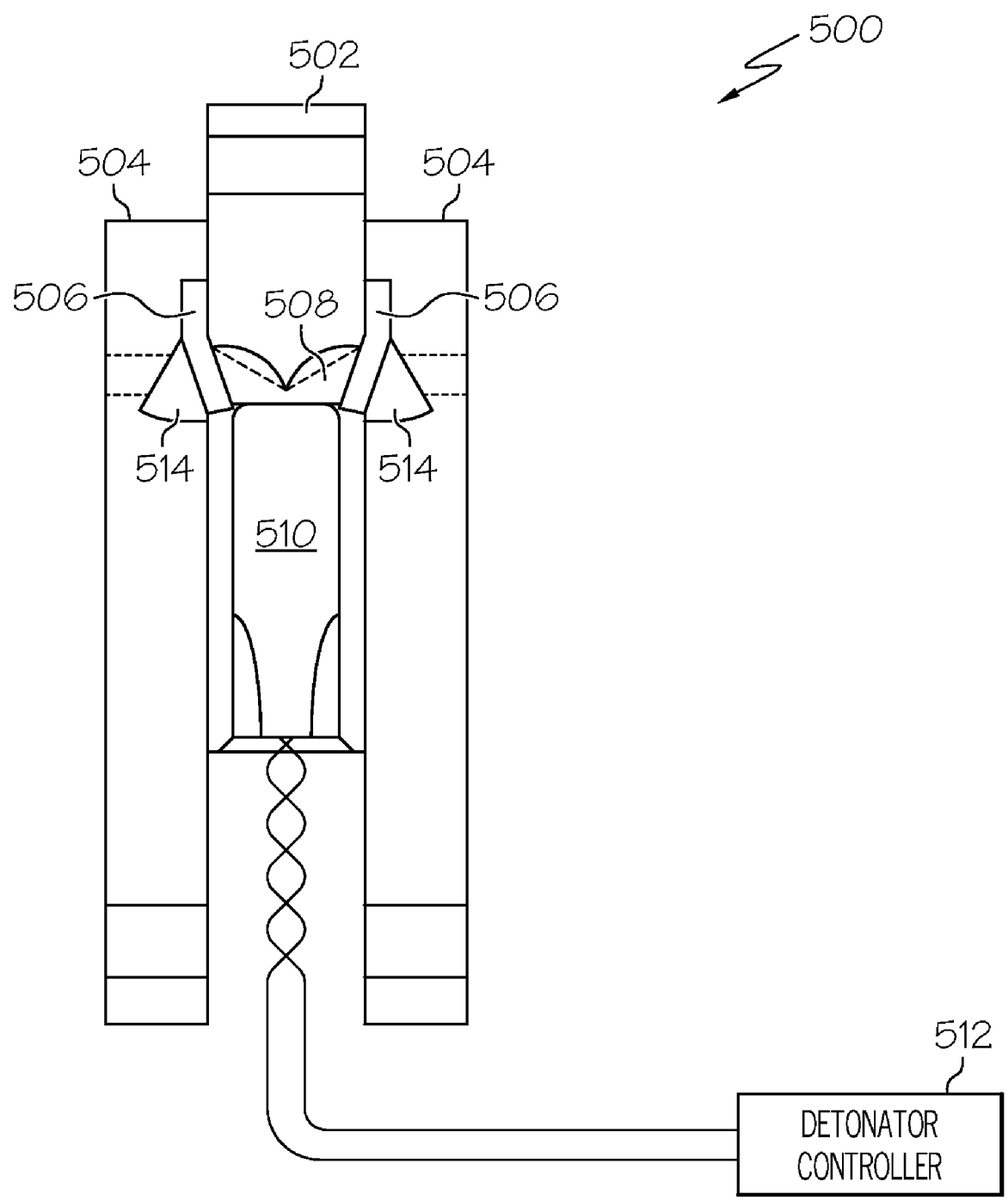
FIG. 10 is a diagram that illustrates an alternate embodiment of a non-frangible releasable coupling device.

It should be appreciated that the embodiments described above can be reconfigured and modified such that: the load carrying element is coupled to or integrated in the outer component (rather than the inner component); the retraction cavity is formed in the outer component (rather than the inner component); and the explosive element upon detonation forces the load carrying element away from the inner component. Thus, an alternate embodiment of coupling device 200 (see FIG. 3) could have the "threads" protruding from outer component 204 and into inner component 202. Similarly, an alternate embodiment of coupling device 400 could have load carrying element 406 protruding from outer component 404 and into outer wall 410 of inner component 402. For example, FIG. 10 is a diagram that illustrates a non-frangible releasable coupling device 500 that implements such an alternate configuration.

Coupling device 500 includes, without limitation: an inner component 502; an outer component 504; at least one load carrying element 506; and an explosive element 508. The illustrated embodiment of coupling device 500 also includes a detonator 510 and a detonator controller 512. Coupling device 500 may have a shaft/sleeve configuration similar to that depicted in FIG. 6. Alternatively, coupling device may employ a plate or bar for inner component 502 and two surrounding plates that in combination serve as outer component 504 (for example, such an embodiment may use two opposing linear tabs for the load carrying elements 506). For ease of description, the former configuration will be described here.

In contrast to the embodiments described above, load carrying element 506 is coupled to or integrated in outer component 504, and load carrying element 506 is configured to bend outwardly into a suitably configured retraction cavity 514 formed in outer component 504. Explosive material 508 is located around inner component 502 such that it faces load carrying element 506. Detonator 510, which may be realized as a blasting cap or any form of primary explosive, serves as a detonating charge for explosive material 508. In this regard, detonator 510 is preferably located proximate and adjacent to explosive material 508. In practice, detonator controller 512 is coupled to detonator 510 such that detonator controller 512 can initiate detonation of detonator 510 and, in turn, detonation of explosive material 508. As depicted in FIG. 10, detonator controller 512 can be coupled to detonator 510 using electrical lead wires. At the appropriate time, detonator controller 512 generates and delivers an appropriate electrical signal that triggers detonator 512. Ultimately, detonation of detonator 510 and explosive material 508 forces load carrying element 506 into retraction cavity 514, which releases inner component 502 from outer component 504.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A non-frangible releasable coupling device comprising:
   a first component comprising a first load bearing feature, and a retraction cavity formed therein;
   a second component comprising a second load bearing feature;
   a load carrying element comprising a first end configured for engagement with the first load bearing feature, and a second end configured for engagement with the second load bearing feature, the load carrying element being configured to impede displacement of the first component relative to the second component in at least one direction; and
   a charged element located adjacent to the load carrying element, wherein upon detonation of the charged element forces the second end of the load carrying element into the retraction cavity such that displacement of the first component relative to the second component in the at least one direction is no longer impeded.

2. The non-frangible releasable coupling device of claim 1, wherein:
   the first component comprises a shaft;
   the second component comprises a sleeve having an interior wall facing the shaft;
   the first load bearing feature comprises a shoulder of the shaft;
   the second load bearing feature comprises a shoulder formed in the interior wall of the sleeve; and
   the load carrying element comprises a ring element coupled around the shaft.

3. The non-frangible releasable coupling device of claim 1, wherein:
   the first component comprises a bolt;
   the second component comprises a nut having an interior wall;
   the first load bearing feature comprises a first helical shoulder formed around the bolt;
   the second load bearing feature comprises a second helical shoulder formed around the interior wall of the nut; and
   the load carrying element comprises a helical thread element coupled around the bolt.

4. The non-frangible releasable coupling device of claim 1, wherein:
   the first component comprises an inner component;
   the second component comprises an outer component that at least partially surrounds the inner component, the outer component having an interior wall;
   the first load bearing feature comprises a shoulder on the inner component; and
   the second load bearing feature comprises a shoulder on the interior wall of the outer component.

5. The non-frangible releasable coupling device of claim 1, wherein:
   the second component comprises an inner component;
   the first component comprises an outer component that at least partially surrounds the inner component, the outer component having an interior wall;
   the first load bearing feature comprises a shoulder on the interior wall of the outer component; and
   the second load bearing feature comprises a shoulder on the inner component.

6. The non-frangible releasable coupling device of claim 1, wherein:
the first component comprises an inner component having a cylindrical outer wall;
the second component comprises an outer component having a cylindrical inner wall adjacent to the cylindrical outer wall;
the first load bearing feature comprises a shoulder formed in the cylindrical outer wall; and
the second load bearing feature comprises a shoulder formed in the cylindrical inner wall.

7. The non-frangible releasable coupling device of claim 1, wherein:
the first component comprises an outer component having a cylindrical inner wall;
the second component comprises an inner component having a cylindrical outer wall adjacent to the cylindrical inner wall;
the first load bearing feature comprises a shoulder formed in the cylindrical inner wall; and
the second load bearing feature comprises a shoulder formed in the cylindrical outer wall.

8. The non-frangible releasable coupling device of claim 1, the first load bearing feature comprising a first axial load bearing feature, the second load bearing feature comprising a second axial load bearing feature, and the load carrying element comprising an axial load carrying element.

9. The non-frangible releasable coupling device of claim 1, wherein the retraction cavity is continuous with the first load bearing feature.

10. The non-frangible releasable coupling device of claim 1, wherein the retraction cavity opposes the second load bearing feature.

11. The non-frangible releasable coupling device of claim 1, further comprising an charge cavity formed in the second component, the charge cavity being configured to retain the charged element between the second component and the second end of the load carrying element.

12. The non-frangible releasable coupling device of claim 1, the load carrying element being configured to bend without breaking in response to detonation of the charged element.

13. A non-frangible releasable coupling device comprising:
a first component having a retraction cavity formed therein;
a load carrying element having a first end attached to the first component;
a second component having a load bearing feature and an explosive cavity formed therein proximate the load bearing feature, the load carrying element extend along the first component, bending into the explosive cavity of the second component, and engaging the load bearing feature of the second component, the load carrying element being configured to impede displacement of the first component relative to the second component in at least one direction; and
an explosive element in the explosive cavity and located between the second component and the load carrying element, wherein upon detonation the explosive element forces a portion of the load carrying element out of the explosive cavity and into the retraction cavity such that displacement of the first component relative to the second component in the at least one direction is no longer impeded.

14. The non-frangible releasable coupling device of claim 13, further comprising a detonator for the explosive element.

15. The non-frangible releasable coupling device of claim 14, further comprising a detonator controller coupled to the detonator, the detonator controller being configured to initiate detonation of the detonator.

16. The non-frangible releasable coupling device of claim 13, wherein the retraction cavity opposes the explosive cavity.

17. The non-frangible releasable coupling device of claim 13, the load carrying element being configured to bend without breaking in response to detonation of the explosive element.

* * * * *